US011304255B1

(12) United States Patent
Marupaduga

(10) Patent No.: US 11,304,255 B1
(45) Date of Patent: Apr. 12, 2022

(54) USE OF FREQUENCY BAND COMPARISON AS BASIS TO CONTROL CONFIGURATION OF DUAL-CONNECTIVITY SERVICE

(71) Applicant: Sprint Spectrum L.P., Overland Park, KS (US)

(72) Inventor: Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 41 days.

(21) Appl. No.: 16/869,970

(22) Filed: May 8, 2020

(51) Int. Cl.
*H04W 24/10* (2009.01)
*H04W 76/16* (2018.01)
*H04W 8/24* (2009.01)
*H04W 92/10* (2009.01)

(52) U.S. Cl.
CPC .............. *H04W 76/16* (2018.02); *H04W 8/24* (2013.01); *H04W 24/10* (2013.01); *H04W 92/10* (2013.01)

(58) Field of Classification Search
CPC ....... H04W 76/16; H04W 24/10; H04W 8/24; H04W 92/10
See application file for complete search history.

(56) References Cited

U.S. PATENT DOCUMENTS

| | | |
|---|---|---|
| 2014/0335882 A1 | 11/2014 | Lee et al. |
| 2016/0029376 A1* | 1/2016 | Fukuta .............. H04W 74/0833 370/329 |
| 2016/0157155 A1 | 6/2016 | Chiba et al. |
| 2018/0279218 A1 | 9/2018 | Park et al. |
| 2018/0376401 A1 | 12/2018 | Karimli et al. |
| 2019/0037626 A1 | 1/2019 | Kronestedt et al. |
| 2020/0092879 A1 | 3/2020 | Wu |
| 2020/0145888 A1 | 5/2020 | Paladugu et al. |
| 2020/0344839 A1* | 10/2020 | Kwok .................. H04B 17/318 |
| 2021/0076441 A1 | 3/2021 | Guha et al. |

FOREIGN PATENT DOCUMENTS

WO   WO 2019/170209   9/2019

OTHER PUBLICATIONS

Office Action in U.S. Appl. No. 16/842,465, dated Jun. 1, 2021.
Office Action in U.S. Appl. No. 16/842,465, dated Sep. 27, 2021.

* cited by examiner

*Primary Examiner* — Chuong A Ngo

(57) ABSTRACT

When a first access node is serving a UE with standalone connectivity on a first frequency band and is considering setup of dual-connectivity service for a UE where a secondary connection for the UE would be on the first frequency band as well, the first access node could determine that the UE supports dual-band dual-connectivity service and could responsively (i) reconfigure the UE's connection with the first access node to be on a second frequency band instead and (ii) configure the secondary connection on the first frequency band. This process could help conserve the first access node's resources on the first frequency band for use to serve dual-connectivity-capable UEs that are not dual-band dual-connectivity capable.

20 Claims, 4 Drawing Sheets

USE OF FREQUENCY BAND COMPARISON AS BASIS TO CONTROL CONFIGURATION OF DUAL-CONNECTIVITY SERVICE

BACKGROUND

A cellular wireless network typically includes a number of access nodes that are configured to provide wireless coverage areas in which user equipment devices (UEs) such as cell phones, tablet computers, machine-type-communication devices, tracking devices, embedded wireless modules, and/or other wirelessly equipped communication devices (whether or not user operated) can operate. Each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could operate on one or more radio-frequency (RF) carriers, each of which could be frequency division duplex (FDD), with separate frequency channels for downlink and uplink communication, or time division duplex (TDD), with a single frequency channel multiplexed over time between downlink and uplink use.

Each such carrier could be defined within an industry standard frequency band, by its frequency channel(s) being defined within the frequency band. Examples of such frequency bands include, without limitation, (i) Band 25, which supports FDD carriers and extends from 1850 MHz to 1915 MHz on the uplink and 1930 MHz to 1995 MHz on downlink, (ii) Band 26, which supports FDD carriers and extends from 814 MHz to 849 MHz on the uplink and 859 MHz to 894 MHz on the downlink, (iii) Band 71, which supports FDD carriers and extends from 663 MHz to 698 MHz on the uplink and 617 MHz to 652 MHz on the downlink, (iv) Band 41, which supports TDD carriers and extends from 2496 MHz to 2690 MHz, (v) Band N260, which supports TDD carriers and extends from 27 GHz to 40 GHz, and (vi) Band N261, which supports TDD carriers and extends from 27.5 GHz to 28.35 GHz.

On the downlink and uplink channels, the air interface provided by an access node on a given carrier could be configured in a specific manner to define physical resources for carrying information wirelessly between the access node and UEs.

In a non-limiting example implementation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval, the resource elements on the downlink and uplink of the example air interface could be grouped to define physical resource blocks (PRBs) that could be allocated as needed to carry data between the access node and served UEs.

In addition, certain resources on the downlink and/or uplink of each such cell could be reserved for special purposes.

On the downlink, for instance, certain resource elements in each downlink subframe could be generally reserved to define a downlink control channel for carrying control signaling such as PRB-allocation directives and the like to served UEs, and other resource elements in each downlink subframe could be generally reserved to define an uplink shared channel in which the PRBs noted above can be allocated to carry data from the access node to UEs. Further, certain resource elements in designated downlink subframes could be reserved to carry synchronization signals that UEs could detect as an indication of coverage, other resource elements distributed in a defined pattern throughout each downlink subframe could be reserved to carry a reference signal that UEs could measure in order to determine coverage strength.

And on the uplink, certain resource elements in each uplink subframe could be generally reserved to define an uplink control channel for carrying control signaling such as scheduling requests from UEs to the access node, and other resource elements in each uplink subframe could be generally reserved to define an uplink shared channel in which the PRBs noted above can be allocated to carry data from UEs to the access node. Further, certain resource elements on the uplink could be specially reserved to carry other uplink signals, such as random access signals, sounding reference signals, and the like.

Other air-interface configurations are possible as well.

OVERVIEW

When a UE enters into coverage of an example network, the UE could detect threshold strong coverage of an access node on a particular carrier (e.g., a threshold strong reference signal broadcast by the access node on the carrier) and could then engage in random-access and connection signaling, such as Radio Resource Control (RRC) signaling, to establish an air-interface connection (e.g., RRC connection) through which the access node will then serve the UE on that carrier.

Further, if the UE is not already registered for service with the core network, the UE could transmit to the access node an attach request, which the access node could forward to a core-network controller for processing. And the core-network controller and access node could then coordinate setup for the UE of one or more user-plane bearers, each including an access-bearer portion that extends between the access node and a core-network gateway that provides connectivity with a transport network and a data-radio-bearer portion that extends over the air between the access node and the UE.

Once the UE is so connected and registered, the access node could then serve the UE in a connected mode over the air-interface connection, managing downlink air-interface communication of packet data to the UE and uplink air-interface communication of packet data from the UE.

For instance, when the core-network gateway receives user-plane data for transmission to the UE, the data could flow to the access node, and the access node could buffer the data, pending transmission of the data to the UE. With the example air-interface configuration noted above, the access node could then allocate downlink PRBs in an upcoming subframe for carrying at least a portion of the data, defining a transport block, to the UE. And the access node could then transmit to the UE in the downlink control channel of that subframe a Downlink Control Information (DCI) message that designates the allocated PRBs, and the access node could accordingly transmit the transport block to the UE in those designated PRBs.

For each such downlink transmission, the UE could then determine if the UE received transport block successfully. For instance, the transmission could carry a cyclic redundancy check (CRC) value computed based on the transport block, and the UE could compute a CRC based on the received transport block and determine whether its computed CRC matches that carried by the transmission. If the UE receives the transmission and determines that the CRC matches or otherwise that the UE received the transport block successfully, then the UE could transmit to the access node a positive acknowledgement (ACK) control message, and the access node could then proceed with transmission of a next transport block (if any) to the UE. Whereas, if the UE did not receive the transmission or determined that the CRC did not match and thus that there was an error in the received transport block, then the UE could transmit to the access node a negative acknowledgement (NACK), in response to which the access node could attempt the transmission again.

Likewise, on the uplink, when the UE has user-plane data for transmission on the transport network, the UE could buffer the data, pending transmission of the data to the access node, and the UE could transmit to the access node a scheduling request that carries a buffer status report (BSR) indicating the quantity of data that the UE has buffered for transmission. With the example air-interface configuration noted above, the access node could then allocate uplink PRBs in an upcoming subframe to carry a transport block of the data from the UE and could transmit to the UE, in the downlink channel of a preceding subframe, a DCI message that designates those upcoming PRBs. And the UE could then accordingly transmit the transport block to the access node in the designated PRBs.

As with downlink transmission, for each transport block that the UE transmits to the access node, the access node could determine if the transport block arrived successfully, based on a CRC analysis for instance. And if the access node received the transmission successfully, then the access node could transmit to the UE an ACK and could schedule a next uplink transmission from the UE. Whereas, if the access node did not receive the transmission successfully, then the access node could transmit to the UE a NACK, and the UE could attempt retransmission to the access node.

When the industry advances from one generation of wireless technology to the next, or in other scenarios, networks and UEs may also support dual-connectivity service, where a UE is served on co-existing connections according to multiple different RATs.

For instance, the network could be equipped with a first access node that provides coverage and service according to a first RAT ("first-RAT access node") and a second access node that provides overlapping coverage and service according to a second RAT ("second-RAT access node"), and a UE positioned within coverage of the access nodes could have a first radio configured to engage in service according to the first RAT and a second radio configured to engage in service according to the second RAT. With this arrangement, the UE may be able to establish a first air-interface connection with the first-RAT access node according to the first RAT and a second air-interface connection with the second-RAT access node according to the second RAT, and the access nodes may then concurrently serve the UE over those connections according to their respective RATs.

Such dual-connectivity (or "non-standalone" connectivity) could help facilitate increased peak data-rate of communications, by multiplexing the UE's communications across the multiple air-interface connections. Further or alternatively, dual-connectivity may provide other benefits compared with serving a UE on a single connection according to a single RAT (as "standalone" connectivity).

In a representative dual-connectivity implementation, the first-RAT access node could operate as a master node (MN), responsible for coordinating setup and teardown of dual-connectivity service for the UE and functioning as an anchor point for RRC signaling and core-network control signaling related to the dual-connectivity service, and the second-RAT access node could function as a secondary node (SN), mainly to provide added connectivity and increased aggregate bandwidth for the UE.

When the UE enters into coverage of such a system, the UE could initially scan for and discover threshold strong first-RAT coverage of the MN on a given carrier, and the UE could responsively engage in signaling as discussed above to establish a first-RAT air-interface connection between the UE and the MN on that carrier. Further, the UE could engage in attach signaling with a core-network controller via the MN, and the core-network controller and MN could coordinate establishment for the UE of at least one bearer as discussed above.

The MN could then serve the UE in a standalone mode with packet-data communications in the manner described above. Further, perhaps having determined from profile data that the UE is dual-connectivity-capable, the MN could trigger and/or engage in a process to establish for the UE a second-RAT air-interface connection between the UE and an SN, so that the MN and SN can then cooperatively provide the UE with dual-connectivity service.

For instance, the MN could direct the UE to scan for secondary coverage under the second RAT, possibly identifying one or more SNs and associated carriers for which the UE should scan, and could receive in response from the UE a report that the UE detected threshold strong coverage of one or more SNs. And the MN could then coordinate setup of dual-connectivity service with the UE being served by the MN and such an SN.

While the specifics of setting up dual-connectivity may vary from implementation to implementation, in an example, the MN could engage in signaling with the SN, with the UE, and with the core-network controller, to coordinate setup of the dual-connectivity service. For instance, the MN could engage in signaling with the UE and with the SN to coordinate setup of a second-RAT connection between the UE and the SN. And the MN could engage in signaling with the core-network controller and/or with the SN to coordinate setup of a split bearer for the UE so that the MN could serve a portion of the UE's data communications and the SN could serve another portion of the UE's data communications.

Further, various split-bearer arrangements may be possible.

In one example implementation, the split bearer could be established at the gateway, with one bearer leg extending between the gateway and the MN and another bearer leg extending between the gateway and the SN. For instance, while maintaining the UE's access bearer between the MN and the gateway, the core-network controller could coordinate setup of a secondary access bearer between the SN and the gateway. With this arrangement, communications between the UE and the MN could flow over the access bearer between the MN and the gateway, and communications between the UE and the SN could flow over the access bearer between the SN and the gateway.

In another example implementation, the split bearer could be established at the SN, with the UE's access bearer extending between the gateway and the SN and a leg of the bearer extending further between the SN and the MN. For instance, the core-network controller could coordinate transfer of the UE's access bearer from being between the gateway and the MN to instead being between the gateway and the SN, and the MN and SN could coordinate setup of the bearer leg between the MN and the SN. With this arrangement, communications between the SN and the UE would flow over the access bearer between the SN and the gateway, and communications between the MN and the UE would flow between the MN and the SN and likewise over the access bearer between the SN and the gateway.

And in yet another example implementation, the split bearer could be established at the MN, with the UE's access bearer still extending between the gateway and the MN, and with a leg of the bearer extending between the MN and the SN. For instance, the MN could maintain the access bearer between the MN and the gateway, and the MN and SN could coordinate setup of the bearer leg between the MN and the SN. With this arrangement, communications between the MN and the UE could flow over the access bearer between the MN and the gateway, and communications between the SN and the UE could flow between the SN and the MN and likewise over the access bearer between the MN and the gateway.

With dual-connectivity service so established through this and/or other steps, the MN and SN could then concurrently serve the UE over their respective connections with the UE, perhaps with both providing for both downlink and uplink downlink scheduled data communication, or perhaps with both providing for downlink scheduled data communication but just the one of the access nodes providing for uplink scheduled data communication, among other possibilities.

On the downlink, for instance, when the core network has data destined to the UE, the MN could coordinate downlink transmission of some of the data over the air from the MN to the UE as discussed above, and the SN could coordinate downlink transmission of other of the data over the air from the SN to the UE as discussed above. Likewise, when the UE has data to transmit, the UE could send to the MN a scheduling request for transmission of some of the data to the MN, and the MN could coordinate uplink transmission of that data over the air from the UE to the MN, and the UE could send to the SN a scheduling request for transmission of other of the data to the SN, and the SN could coordinate uplink transmission of that data over the air from the UE to the SN. Or the UE could limit its uplink transmission to just one of the access nodes.

One technical consideration in configuring such dual-connectivity service is whether the MN and SN would serve the UE on the same frequency band as each other or rather on different frequency bands than each other. Namely, at issue could be whether the first-RAT carrier on which the UE would be connected with the MN is in the same frequency band as the second-RAT carrier on which the UE would be connected with the SN. A dual-connectivity configuration where the UE's first-RAT carrier and second-RAT carrier are in the same band as each other is referred to as single-band dual connectivity. Whereas a dual-connectivity configuration where the UE's first-RAT carrier and second-RAT carrier are in different frequency bands than each other is referred to as dual-band dual connectivity.

In an example implementation, most or all UEs that support dual-connectivity service will support single-band dual connectivity, but only some of those UEs may also support dual-band dual connectivity. Operating with dual-band dual connectivity may require the use of more complicated or otherwise different RF architecture and associated software than operating with single-band dual connectivity and may also require a different service subscription and/or associated provisioning than operating with single-band dual connectivity. In practice, some dual-connectivity-capable devices may be so equipped and have any applicable service subscriptions and/or associated provisioning and may therefore be "dual-band-dual-connectivity capable," supporting both single-band dual connectivity and dual-band dual connectivity. But other dual-connectivity-capable devices may not be so equipped and/or may lack applicable service subscriptions and/or associated provisioning and may therefore be "single-band-dual-connectivity capable," supporting single-band dual connectivity but not dual-band dual connectivity.

In a scenario where an MN is configured to provide first-RAT service on both a first frequency band and a second frequency band and where an SN will provide service on the first frequency band, at issue could be whether the dual-connectivity that the MN configures for a dual-band-dual-connectivity-capable UE should be single-band dual connectivity or rather dual-band dual connectivity. For instance, if the UE initially has standalone first-RAT connectivity with the MN on the first frequency band and the MN will configure for the UE a second-RAT connection with the second access node on the first frequency band, at issue could be whether (i) the MN should maintain the UE's first-RAT connection on the first frequency band, so that the UE would then have single-band dual connectivity or rather (ii) the MN should reconfigure the UE's first-RAT connection to be on the second frequency band, so that the UE would then have dual-band dual connectivity.

The present disclosure provides a mechanism to help address this issue. According to the disclosure, when the first access node is going to configure dual connectivity for a UE, the first access node will determine that the UE supports both single-band dual connectivity and dual-band dual connectivity, and based at least in part on that determination, the first access node will configure the dual connectivity as dual-band dual connectivity rather than single-band dual connectivity. For instance, if the UE initially has standalone first-RAT connectivity with the MN on the first frequency band, the MN could reconfigure the UE's first-RAT connection to be on the second frequency band and could then configure for the UE the second-RAT connection with the second access node on the first frequency band.

One technical reason for configuring the UE's dual connectivity as dual-band dual connectivity rather than single-band dual connectivity could be to help conserve the first access node's air-interface resources on the first frequency band for use to serve single-band-dual-connectivity-capable UEs. Namely, where second-RAT connectivity would be on the first frequency band, it would be useful to conserve the first access node's resources on the first frequency band for use to serve UEs that support singe-band dual connectivity but not dual-band dual connectivity, and therefore for the first access node to serve dual-band-dual-connectivity-capable UEs on the second frequency band instead.

Further, this technical reason may apply especially in a situation where the first access node is serving numerous dual-connectivity-capable UEs and where a high percentage of the UEs are just single-band-dual-connectivity capable. In that situation, it may be even more useful for the first access node to serve dual-band-dual-connectivity-capable UEs on the second frequency band, so as to help ensure sufficient resource availability on the first frequency band for use to serve the single-band-dual-connectivity-capable UEs.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of 4G LTE, 5G NR, and 4G-5G dual connectivity, referred to as EUTRA-NR Dual Connectivity (EN-DC). With EN-DC, a 4G access node (4G evolved Node-B (eNB)) typically functions as the MN, and a 5G access node (5G next-generation Node-B (gNB)) typically functions as the secondary access node. Thus, a UE would first establish a standalone-4G connection with a 4G eNB, and the 4G eNB could then coordinate setup of EN-DC service for the UE, including setup for the UE of a secondary 5G connection with a 5G gNB. And the 4G eNB and 5G gNB could then concurrently serve the UE over their respective 4G and 5G connections with the UE.

It should be understood, however, that the principles disclosed herein could extend to apply with respect to other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways.

Figure 1:
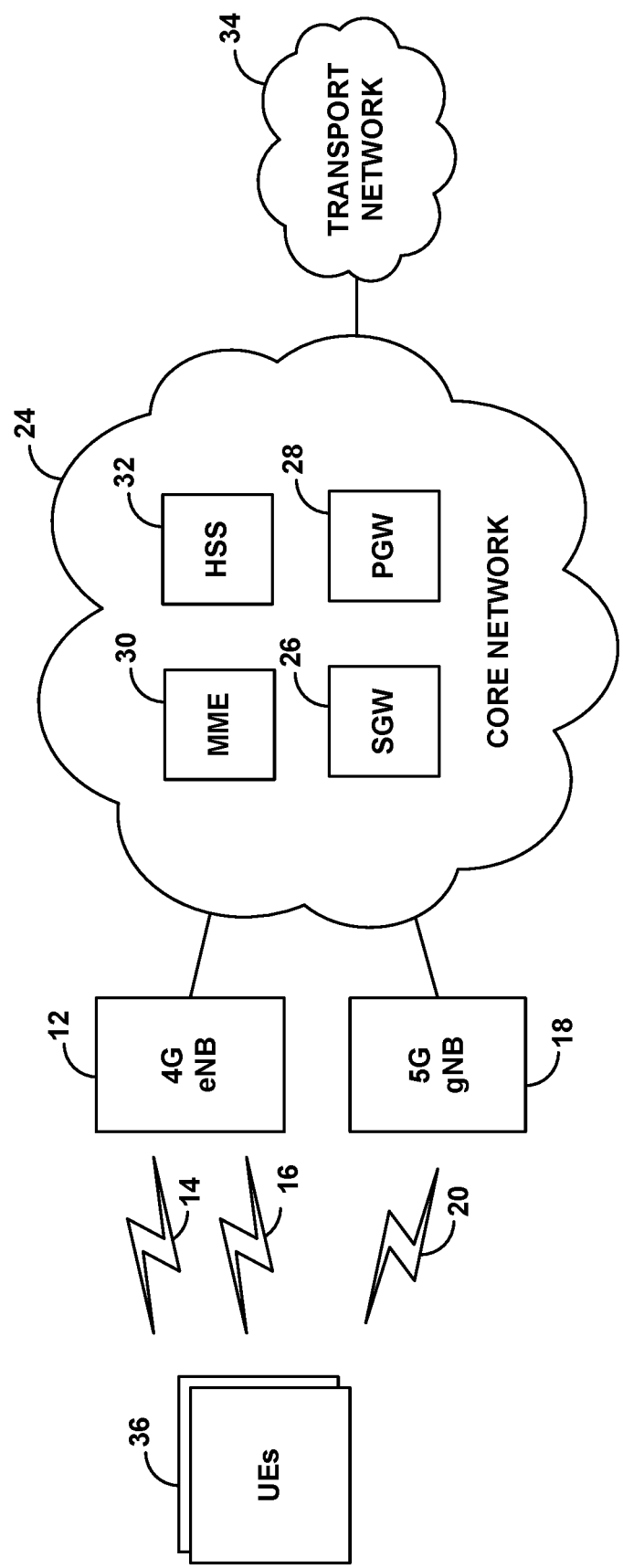
FIG. 1 is a simplified block diagram of an example network arrangement in which features of the present disclosure can be implemented.

FIG. 1 depicts an example network having a 4G eNB 12 that is configured to provide 4G service on each of two example 4G carriers 14, 16, and an example 5G gNB 18 that is configured to provide 5G service on an example 5G carrier 20. Each of these access nodes could be a macro access node of the type configured to provide a wide range of coverage or could take other forms, such as a small cell access node, a repeater, a femtocell access node, or the like, which might be configured to provide a smaller range of coverage, among other possibilities. Further, these access nodes could be collocated with each other and could provide coverage in largely the same direction as each other, to define an area in which UEs can engage in both 4G service provided by the 4G eNB 12 and 5G service provided by 5G gNB 18.

In representative 4G and 5G implementations, each carrier could be FDD or TDD and could thus define separate downlink and uplink frequency channels or a single frequency channel multiplexed over time between downlink and uplink use. In any event, each frequency channel of a carrier could be characterized by a defined frequency bandwidth (width in RF spectrum) and center frequency and may have a unique carrier identifier. And each such carrier respectively could be defined within an industry standard frequency band such as one of those noted above. Without limitation, but by way of example for the present discussion, the access nodes could be configured with 4G carrier 14 being defined in band 41, 4G carrier 16 being defined in band 25, and 5G carrier 20 being defined in band 41.

Further, the air interface on each of these carriers could be structured as described above by way of example, being divided over time into frames, subframes, timeslots, and symbol time segments, and over frequency into subcarriers, thus defining an array of air-interface resource elements grouped into PRBs allocable by the access node as noted above, for use to carry data to or from served UEs. Though carrier-structure and/or service on the 4G and 5G air-interfaces could differ from each other in various ways now known or later developed, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities.

As further shown, the example 4G and 5G access nodes in the example arrangement are each connected with a core network 24, which could be an Evolved Packet Core (EPC) network or Next Generation Core (NGC) network, among other possibilities. In the example shown, the core network includes a serving gateway (SGW) 26, a packet data network gateway (PGW) 28, a mobility management entity (MME) 30, and a home subscriber server (HSS) 32, although other arrangements are possible as well.

In an example implementation, without limitation, each access node could have an interface with the SGW, the SGW could have an interface with the PGW, and the PGW could provide connectivity with a transport network 34. Further, each access node could have an interface with the MME, and the MME could have an interface with the SGW, so that the MME could coordinate setup of bearers for UEs to enable the UEs to engage in packet-data communication via 4G and 5G. Alternatively, just the 4G eNB might have an interface with the MME and may function as an anchor for signaling with the MME both for 4G service and for 5G service with EN-DC.

Still further, the HSS could store UE profile records, which could specify service-subscription plans, UE configurations, and/or other such UE capability information, such as whether a UE is EN-DC capable, and if so whether the UE supports dual-band EN-DC service or just single-band EN- DC service. Whether a UE supports dual-band EN-DC service or rather just single-band EN-DC service might be a subscription issue and/or more might depend on hardware and/or software configuration of the UE, such as whether the UE is equipped with RF circuitry and logic that enables the UE to communicate concurrently on two different frequency bands for instance, among possibly other factors.

FIG. 1 further depicts various example UEs 36 that may from time to time be within coverage of the 4G and 5G access nodes and may from time to time be served by the access nodes. In a representative implementation, each such UE may be 4G and 5G capable, including both a 4G radio and associated equipment and logic that enables the UE to connect with and be served by a 4G eNB, and a 5G radio and associated equipment and logic that enables the UE to connect with and be served by a 5G gNB.

Further, each such UE may support EN-DC service, so the UE would support single-band EN-DC service, and each UE may or may not also support dual-band EN-DC service. For instance, a given UE may support dual-band EN-DC service, so the UE would support both single-band EN-DC service and dual-band EN-DC service, whereas another UE may not support dual-band EN-DC service, so the UE would support single-band EN-DC service but not dual-band EN-DC service.

In line with the discussion above, upon entering into coverage of the access nodes as shown, a representative such UE 36 could initially scan for 4G coverage and discover threshold strong coverage of 4G eNB 12 on a given carrier. By way of example, we can assume that the UE discovers such coverage on 4G carrier 14, which as noted above is defined in frequency band 41. The UE could then engage in RRC signaling with the 4G eNB 12 to establish a 4G connection on 4G carrier 14 as discussed above. (Note that the 4G eNB 12 might provide the UE with 4G carrier-aggregation service on multiple carriers, but if so, the UE's primary 4G connection in this example would be on the 4G carrier 14 defined in frequency band 41.) Further, if appropriate, the UE could engage in attach signaling with the MME through the 4G connection, and the MME could coordinate setup of a bearer for the UE.

In relation to this attachment process, the 4G eNB 12 could also transmit to the UE an RRC message carrying a UE-capability enquiry, and the UE could respond to the 4G eNB 12 with a "UE capability information" information element (IE), which could indicate that the UE is EN-DC capable and, if so, could indicate whether the UE supports dual-band EN-DC. Alternatively, the 4G eNB 12 could receive such capability information from the MME, which could obtain the information from the HSS 32. The 4G eNB 12 could then store this UE capability data in a context record for reference while serving the UE.

If the UE's capability data indicates that the UE supports EN-DC, then the 4G eNB 12 could also proceed to configure EN-DC service for the UE.

For instance, the 4G eNB 12 could transmit to the UE a "B1" (inter-RAT) measurement object that directs the UE to scan for 5G coverage, possibly identifying one or more 5G gNBs and associated 5G carriers for which the UE should scan, and the 4G eNB could then receive in response from the UE a measurement report indicating that the UE detects threshold strong coverage of 5G gNB 18 on carrier 20, which as noted above is also defined in frequency band 41. And the 4G eNB 12 could then coordinate setup of EN-DC service for the UE, including setup of a 5G connection with the 5G gNB 18 on carrier 20 and setup of a split bearer as discussed above. (Here, as above with 4G, the 5G gNB 18 might provide the UE with 5G carrier-aggregation service on multiple carriers, but if so, the UE's primary 5G connection in this example would be on 5G carrier 20 defined in frequency band 41.) The 4G eNB and 5G gNB could then each serve the UE with packet-data communications over their respective connections with the UE, in the manner discussed above.

In line with the discussion above, the 4G eNB 12 could further take into consideration whether the UE at issue is dual-band-EN-DC capable, as a basis to control whether to set up dual-band EN-DC for the UE or rather single-band EN-DC for the UE. In particular, if the UE that is connected with the 4G eNB 12 on a 4G carrier in frequency band 41 is dual-band-EN-DC capable, the 4G eNB 12 could then have a choice of whether to configure single-band EN-DC for the UE or rather to configure dual-band EN-DC for the UE.

To configure single-band EN-DC for the UE, the 4G eNB 12 could maintain the UE's 4G connection on frequency band 41 and could configure for the UE a secondary 5G connection with 5G gNB 18 also on frequency band 41. Whereas, to configure dual-band EN-DC for the UE, the 4G eNB 12 could reconfigure the UE's 4G connection from being on 4G carrier 14 in frequency band 41 to being instead on 4G carrier 16 in frequency band 25 and could configure for the UE a secondary 5G connection with 5G gNB 18 on frequency band 41. Reconfiguring the UE's 4G connection from being on 4G carrier 14 to being instead on 4G carrier 16 could involve transmitting to the UE an RRC connection reconfiguration message that directs the change in carrier on which the UE will be connected with the 4G eNB 12 and further updating the UE's context record accordingly.

As discussed above, the 4G eNB 12 in this situation could determine that the UE at issue is dual-band-EN-DC capable and, based at least on that fact, could configure dual-band EN-DC for the UE. In particular, given a determination that the UE at issue supports both single-band EN-DC and dual-band EN-DC, the 4G eNB 12 could configure the dual-band EN-DC for the UE.

As explained above, configuring dual-band EN-DC rather than single-band EN-DC for the UE in this situation could help to conserve resources on the 4G eNB's 4G carrier 14 in frequency band 41 for use to serve EN-DC-capable UEs that support single-band EN-DC but that do not support dual-band EN-DC.

Further, as noted above, this can be especially useful in a situation where the 4G eNB 12 is currently serving multiple EN-DC-capable UEs that are single-band EN-DC capable and that are not dual-band EN-DC capable, as there could be more of a need in that situation to conserve resources of the 4G eNB's carrier 12 in frequency band 41 for use to serve those UEs with EN-DC. Therefore, the decision of the 4G eNB 12 to configure dual-band EN-DC rather than single-band EN-DC for the UE at issue could be additionally based on a determination by the 4G eNB 12 that a threshold high percentage of the 4G eNB's currently connected EN-DC capable UEs are single-band-EN-DC-capable rather than dual-band-EN-DC capable. Here, a representative threshold percentage could set by engineering design to a value over 50%, among other possibilities.

Note also that the 4G eNB 12 could reserve some of the air-interface resources (e.g., PRBs) of its 4G carrier 16 in frequency band 25 for use to serve UEs that are dual-band-EN-DC capable. For instance, the 4G eNB 12 could be set in advance of any scheduling of PRBs to treat certain PRBs on 4G carrier 16 (or a certain percentage of PRBs on 4G carrier 16) as being available to use only for service of dual-band-EN-DC-capable UEs or at least not being available to use for service of single-band-EN-DC-capable UEs. The 4G eNB 12 could do this as well in response to at least determining that a threshold high percentage of EN-DC-capable UEs currently connected with the 4G eNB 12 are single-band-EN-DC capable rather than dual-band-EN-DC capable.

Figure 2:
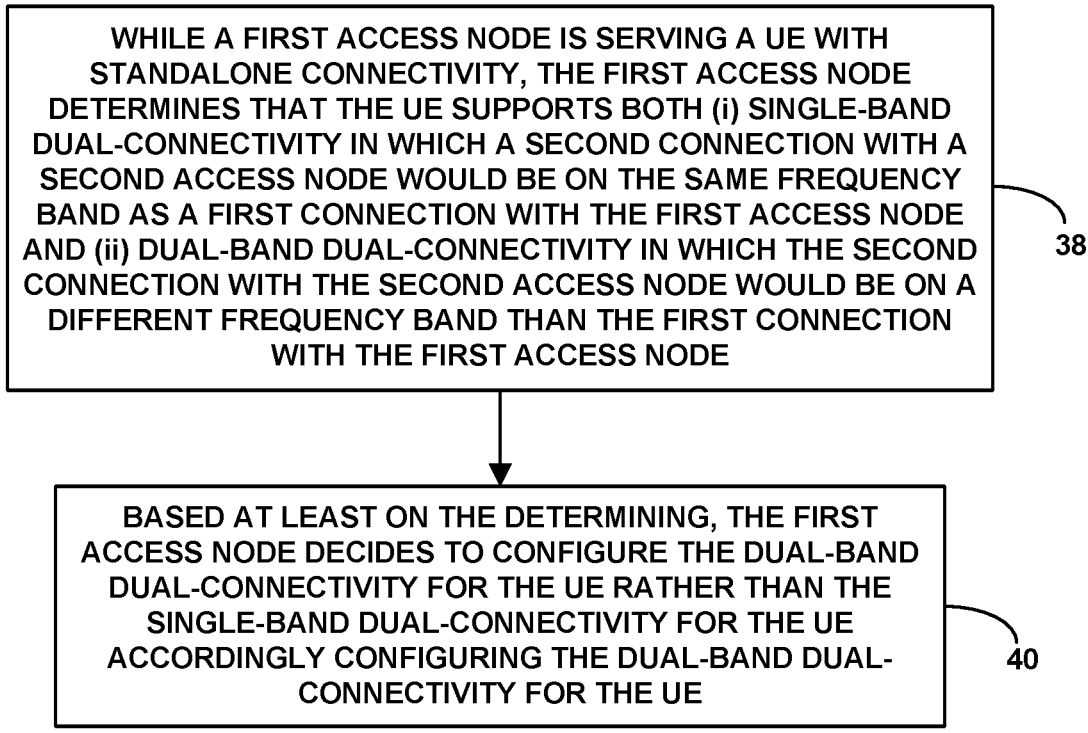
FIG. 2 is a flow chart depicting an example method in accordance with the present disclosure.

FIG. 2 is next a flow chart depicting an example method for controlling configuration of dual-connectivity service for a UE, the dual-connectivity service including the UE being served concurrently by a first access node over a first connection according to a first RAT and by a second access node over a second connection according to a second RAT, in a scenario where the first access node operates on a first frequency band and on a second frequency band and where the second access node operates on the first frequency band.

In an example implementation, the first RAT could be 4G LTE, the second RAT could be 5G NR, and the dual-connectivity service could be EN-DC. Further, the method could be carried out in a wireless communication system such as that shown in FIG. 1, including a first access node configured to provide service according to the first RAT on both a carrier in the first frequency band and a carrier in the second frequency band, and a second access node configured to provide service according to the second RAT on a carrier in the first frequency band.

As shown in FIG. 2, at block 38, the method includes, while the first access node is serving the UE with standalone connectivity, the first access node determining that the UE supports both (i) single-band dual-connectivity in which the second connection with the second access node would be on the same frequency band as the first connection with the first access node and (ii) dual-band dual-connectivity in which the second connection with the second access node would be on a different frequency band than the first connection with the first access node. And at block 40, the method includes, based at least on the determining, the first access node deciding to configure the dual-band dual-connectivity for the UE rather than the single-band dual-connectivity for the UE accordingly configuring the dual-band dual-connectivity for the UE.

In line with the discussion above, the act of determining that the UE supports both single-band dual-connectivity and dual-band dual-connectivity could be carried out while the first access node is serving the UE with the standalone connectivity over the first connection and the first connection is on the second frequency band (e.g., on a carrier in the second frequency band). And in that case, the act of configuring the dual-band dual-connectivity for the UE could involve (i) maintaining the first connection on the second frequency band and (ii) configuring the second connection on the first frequency band.

Alternatively, the act of determining that the UE supports both single-band dual-connectivity and dual-band dual-connectivity could be carried out while the first access node is serving the UE with the standalone connectivity over the first connection and the first connection is on the first frequency band (e.g., on a carrier in the first frequency band). And in that case, the act of configuring the dual-band dual-connectivity for the UE could involve (i) reconfiguring the first connection from being on the first frequency band to being on the second frequency band and (ii) configuring the second connection on the first frequency band. For instance, the first access node could first reconfigure the first connection and, upon finishing that reconfiguration, could then configure the second connection.

As further discussed above, this method could be carried out when the first access node is serving multiple UEs that are dual-connectivity capable. And in that case, the act of deciding to configure dual-band dual-connectivity for the UE could be additionally based on how many of the UEs are single-band-dual-connectivity capable and are not dual-band-dual-connectivity capable. For instance, the first access node could determine (e.g., based on UE capability data) what percentage of the UEs of are single-band-dual-connectivity capable and are not dual-band-dual-connectivity capable. And based additionally on that determined percentage being at least as high as a predefined threshold high percentage, the first access node could decide to configure the dual-band dual-connectivity for the UE.

In addition or alternatively, as discussed above, the method could include the first access node reserving a set of air-interface resources on the second frequency band for use to serve dual-connectivity-capable UEs that are dual-band-dual-connectivity capable. For instance, the first access node could do this responsive to at least determining that, of multiple dual-connectivity-capable UEs that are currently served by the first access node, at least a predefined threshold high percentage of the dual-connectivity-capable UEs support single-band dual-connectivity and do not support dual-band dual-connectivity.

As further discussed above, the method could be carried out in response to at least the first access node encountering a trigger for configuring the dual-connectivity service for the UE. And encountering the trigger could involve the first access node determining from UE capability data that the UE is dual-connectivity capable. Alternatively or additionally, encountering the trigger could involve the first access node receiving from the UE a measurement report indicating that the UE is within threshold strong coverage of the second access node on a carrier in the first frequency band.

In addition, as discussed above, the act of determining that the UE supports both single-band dual-connectivity and dual-band dual-connectivity could involve determining that the UE supports dual-band dual-connectivity, e.g., that the UE is dual-band-dual-connectivity capable, which could implicitly mean that the UE supports both dual-band dual-connectivity and single-band dual-connectivity—as support for dual-band dual-connectivity could include support for single-band dual-connectivity as well. And making the determination could be based on reference to UE-capability data.

Further, as discussed above, the act of configuring the dual-band dual-connectivity for the UE could involve (i) engaging in signaling to configure the second connection between the UE and the second access node and (ii) engaging in signaling to establish for the UE a split bearer so that the first access node and second access node can both serve the UE with data communications.

Figure 3:
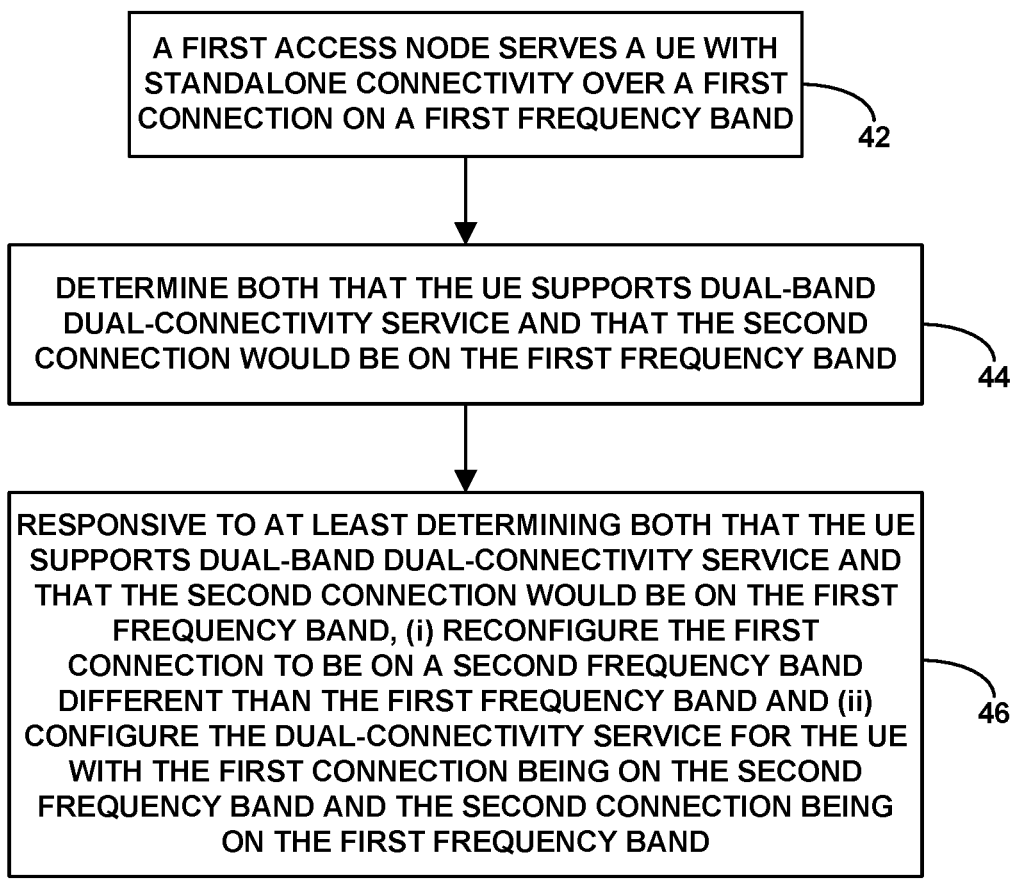
FIG. 3 is another flow chart depicting an example method in accordance with the present disclosure.

FIG. 3 is next another flow chart depicting an example method for controlling configuration of dual-connectivity service for a UE, the dual-connectivity service including the UE being served concurrently over a first connection according to a first RAT and over a second connection according to a second RAT. This method could be implemented in a context similar to that discussed above for instance, by or on behalf of the first access node for example.

As shown in FIG. 3, at block 42, the method includes the first access node serving the UE with standalone connectivity over the first connection on a first frequency band. Further, at block 44, which could be carried out in parallel with block 42, the method includes determining both that the UE supports dual-band dual-connectivity service and that the second connection would be on the first frequency band. And at block 46, the method includes, responsive to at least determining both that the UE supports dual-band dual-connectivity service and that the second connection would be on the first frequency band, (i) reconfiguring the first connection to be on a second frequency band different than the first frequency band and (ii) configuring the dual-connectivity service for the UE with the first connection being on the second frequency band and the second connection being on the first frequency band.

Various features discussed above can be applied in this context as well, and vice versa. For example, the act of the determining that the UE supports dual-band dual-connectivity could be based on reference to UE capability data. And the first RAT could be 4G LTE, the second RAT could be 5G NR, and the dual-connectivity service could be EUTRA-NR Dual Connectivity (EN-DC) service.

Figure 4:
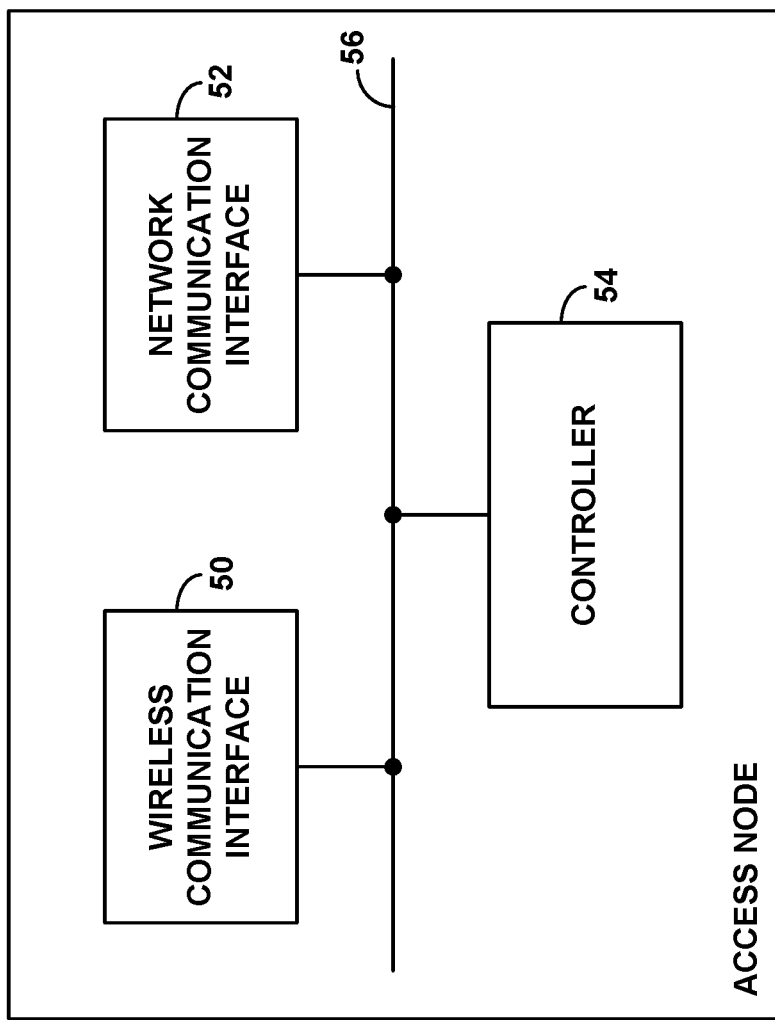
FIG. 4 is a simplified block diagram of an example access node operable in accordance with the present disclosure.

FIG. 4 is next a simplified block diagram depicting an example first access node that could operate in accordance with the present disclosure. As shown, the example first access node includes a wireless communication interface 50, a network communication interface 52, and a controller 54, all of which may be communicatively linked together by a system bus, network, or other connection mechanism 56.

In the context discussed above, this first access node could be configured to engage in air-interface communication and to provide service according to a first RAT through the wireless communication interface 50. Further, the first access node could be provided in a wireless communication system that includes a second access node configured to provide service according to a second RAT. As noted above, these access nodes may be collocated.

In this example first access node, the wireless communication interface 50 could comprise an antenna structure, which could be tower mounted or could take other forms, and associated components such as a power amplifier and a wireless transceiver, so as to facilitate providing a coverage area defining an air interface having a downlink and an uplink, and engaging in transmission and reception of user-plane data and control-plane signaling over the air interface in accordance with the first RAT. And the network communication interface 52 could comprise a wired or wireless interface, such as an Ethernet network communication interface, configured to support communication with other entities, such as with the other access node and various core-network entities.

Further, controller 54 could comprise at least one processing unit (e.g., one or more general purpose processors and/or specialized processors) programmed to cause the first access node to carry out various operations such as those discussed above. For instance, the controller could comprise at least one non-transitory data storage (e.g., one or more magnetic, optical, or flash storage components) holding program instructions executable by the at least one processing unit to cause the access node to carry out such operations to control configuration of dual-connectivity service for UE, where the dual-connectivity service comprises the UE being served concurrently over a first connection according to a first RAT and over a second connection according to a second RAT.

In line with the discussion above, the operations could include, while the first access node is serving the UE over the first connection on a first frequency band, determining that the UE supports dual-band dual-connectivity service and that the second connection would be on the first frequency band as well. And the operations could include, responsive to at least the determining, (i) reconfiguring the first connection to be on a second frequency band different than the first frequency band and (ii) configuring the dual-connectivity service for the UE with the first connection being on the second frequency band and the second connection being on the first frequency band.

Various other features discussed herein can be implemented in this context as well, and vice versa.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A method for controlling configuration of dual-connectivity service for a user equipment device (UE), wherein the dual-connectivity service comprises the UE being served concurrently by a first access node over a first connection according to a first radio access technology (RAT) and by a second access node over a second connection according to a second RAT, wherein the first access node operates on a first frequency band and on a second frequency band, and wherein the second access node operates on the first frequency band, the method comprising:

determining by the first access node, while the first access node is serving the UE with standalone connectivity, that the UE supports both (i) single-band dual-connectivity service in which the first connection would be on the same frequency band as the second connection and (ii) dual-band dual-connectivity in which the first connection would be on a different frequency band than the second connection; and based at least on the determining, deciding by the first access node to configure the dual-band dual-connectivity for the UE rather than the single-band dual-connectivity service for the UE and accordingly configuring the dual-band dual-connectivity for the UE.

2. The method of claim 1, wherein the determining that the UE supports both single-band dual-connectivity and dual-band dual-connectivity is carried out while the first access node is serving the UE with the standalone connectivity over the first connection on the second frequency band, and wherein configuring the dual-band dual-connectivity for the UE comprises:

maintaining the first connection on the second frequency band; and configuring the second connection on the first frequency band.

3. The method of claim 1, wherein the determining that the UE supports both single-band dual-connectivity and dual-band dual-connectivity is carried out while the first access node is serving the UE with the standalone connectivity over the first connection on the first frequency band, and wherein configuring the dual-band dual-connectivity for the UE comprises:

reconfiguring the first connection from being on the first frequency band to being on the second frequency band; and configuring the second connection on the first frequency band.

4. The method of claim 3, wherein the method is carried out when the first access node is serving a plurality of UEs that are dual-connectivity capable, wherein the deciding to configure dual-band dual-connectivity for the UE is additionally based on how many of the UEs of the plurality are single-band-dual-connectivity capable and are not dual-band-dual-connectivity capable.

5. The method of claim 4, wherein deciding to configure dual-band dual-connectivity for the UE additionally based on how many of the UEs of the plurality support single-band dual-connectivity and do not support dual-band dual-connectivity comprises:
  determining what percentage of the UEs of the plurality are single-band-dual-connectivity capable and are not dual-band-dual-connectivity capable; and
  based additionally on the determined percentage being at least as high as a predefined threshold high percentage, deciding to configure the dual-band dual-connectivity for the UE.

6. The method of claim 3, further comprising reserving by the first access node a set of air-interface resources on the second frequency band for use to serve dual-connectivity-capable UEs that are dual-band-dual-connectivity capable.

7. The method of claim 6, wherein the reserving of the set of air-interface resources on the second frequency band is responsive to at least determining that, of a plurality of dual-connectivity-capable UEs currently served by the first access node, at least a predefined threshold high percentage of the dual-connectivity-capable UEs support single-band dual-connectivity and do not support dual-band dual-connectivity.

8. The method of claim 3, wherein the method is carried out in response to at least the first access node encountering a trigger for configuring the dual-connectivity service for the UE.

9. The method of claim 8, wherein the first access node encountering the trigger for configuring the dual-connectivity service for the UE comprises the first access node determining from UE capability data that the UE is dual-connectivity capable.

10. The method of claim 8, wherein the first access node encountering the trigger for configuring the dual-connectivity service for the UE comprises the first access node receiving from the UE a measurement report indicating that the UE is within threshold strong coverage of the second access node on a carrier in the first frequency band.

11. The method of claim 3, wherein determining that the UE supports both single-band dual-connectivity and dual-band dual-connectivity comprises determining that the UE supports dual-band dual-connectivity, wherein support for dual-band dual-connectivity includes support for single-band dual-connectivity.

12. The method of claim 1, wherein determining that the UE supports both single-band dual-connectivity and dual-band dual-connectivity is based on reference to UE-capability data.

13. The method of claim 1, wherein configuring the dual-band dual-connectivity for the UE comprises:
  engaging in signaling to configure the second connection between the UE and the second access node; and
  engaging in signaling to establish for the UE a split bearer so that the first access node and second access node can both serve the UE with data communications.

14. The method of claim 1, wherein the first RAT is 4G Long Term Evolution (LTE), wherein the second RAT is 5G New Radio (NR), and wherein the dual-connectivity is EUTRA-NR Dual Connectivity (EN-DC).

15. A method for controlling configuration of dual-connectivity service for a user equipment device (UE), wherein the dual-connectivity service comprises the UE being served concurrently over a first connection according to a first radio access technology (RAT) and over a second connection according to a second RAT, the method comprising:
  serving by a first access node the UE with standalone connectivity over the first connection on a first frequency band;
  determining both that the UE supports dual-band dual-connectivity service and that the second connection would be on the first frequency band; and
  responsive to at least determining both that the UE supports dual-band dual-connectivity service and that the second connection would be on the first frequency band, (i) reconfiguring the first connection to be on a second frequency band different than the first frequency band and (ii) configuring the dual-connectivity service for the UE with the first connection being on the second frequency band and the second connection being on the first frequency band.

16. The method of claim 15, wherein determining that the UE supports dual-band dual-connectivity is based on reference to UE capability data.

17. The method of claim 15, wherein the first RAT is 4G Long Term Evolution (LTE), wherein the second RAT is 5G New Radio (NR), and wherein the dual-connectivity service is EUTRA-NR Dual Connectivity (EN-DC) service.

18. In a wireless communication system comprising a first access node configured to provide service according to a first radio access technology (RAT) and a second access node configured to provide service according to a second RAT, the first access node comprising:
  a wireless communication interface through which to engage in air-interface communication and provide the service according to the first RAT; and
  a controller, wherein the controller is configured to cause the first access node to carry out operations to control configuration of dual-connectivity service for a user equipment device (UE), wherein the dual-connectivity service comprises the UE being served concurrently over a first connection according to a first radio access technology (RAT) and over a second connection according to a second RAT, the operations including:
    while the first access node is serving the UE over the first connection on a first frequency band, determining that the UE supports dual-band dual-connectivity service and that the second connection would be on the first frequency band as well, and
    responsive to at least the determining, (i) reconfiguring the first connection to be on a second frequency band different than the first frequency band and (ii) configuring the dual-connectivity service for the UE with the first connection being on the second frequency band and the second connection being on the first frequency band.

19. The first access node of claim 18, wherein the controller comprises at least one processing unit, at least one non-transitory data storage, and program instructions stored in the at least one non-transitory data storage and executable by the at least one processing unit to cause the first access node to carry out the operations.

20. The first access node of claim 19, wherein the determining, reconfiguring, and configuring are carried out when the first access node is serving a plurality of UEs that are dual-connectivity capable, wherein the reconfiguring is further responsive to at least a predefined threshold high percentage the plurality of UEs of the plurality supporting single-band dual-connectivity and not supporting dual-band dual-connectivity.

\* \* \* \* \*